May 30, 1939.  A. DUBONNET  2,160,541

ELASTIC SYSTEM

Filed Dec. 12, 1936    2 Sheets-Sheet 1

Inventor:
André Dubonnet,
Barley Pearson
Attorneys

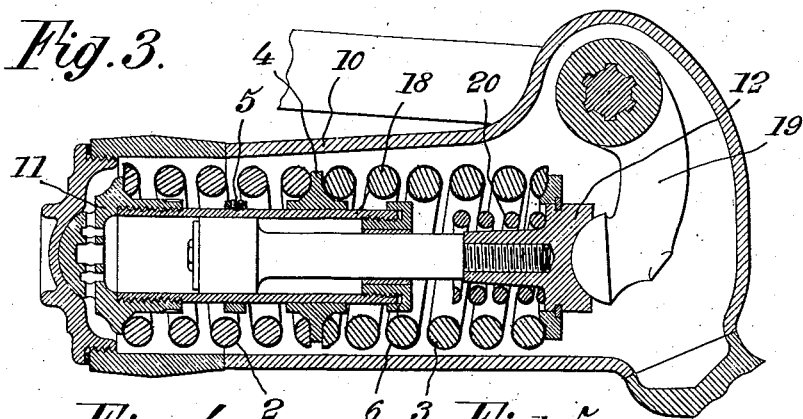
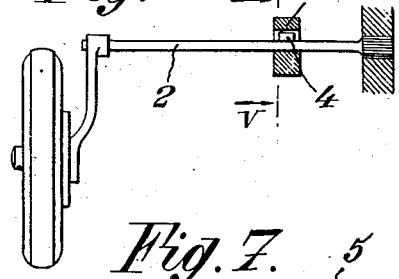
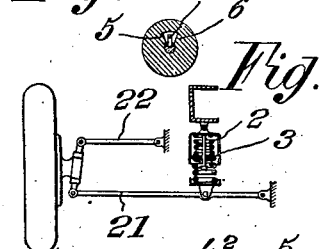
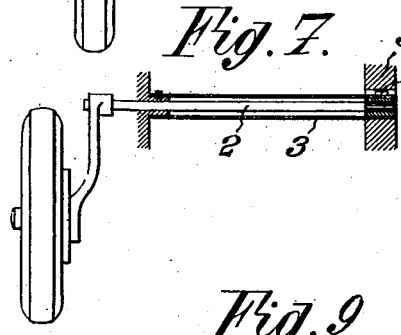
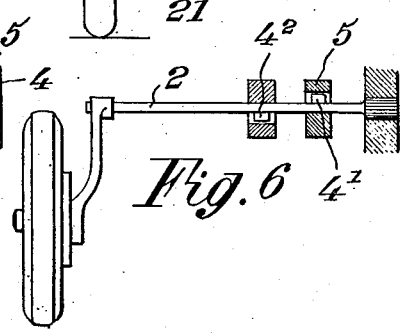
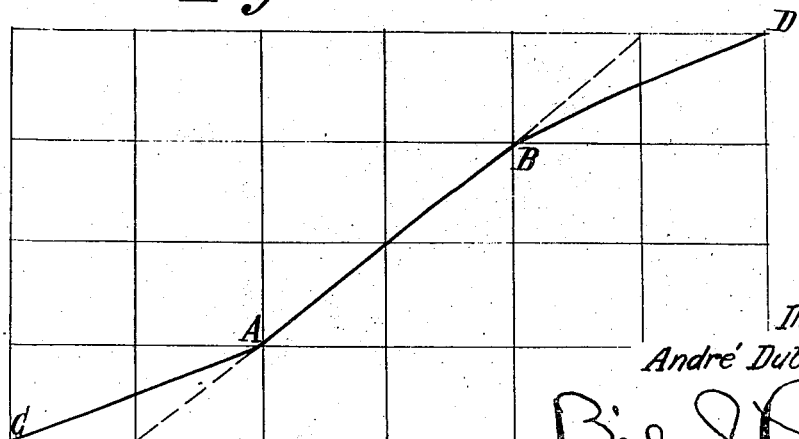

Patented May 30, 1939

2,160,541

UNITED STATES PATENT OFFICE 2,160,541

ELASTIC SYSTEM

André Dubonnet, Neuilly-sur-Seine, France

Application December 12, 1936, Serial No. 115,600
In Belgium November 19, 1936

2 Claims. (Cl. 267—20)

The present invention relates to elastic systems of the variable flexibility type, and especially to elastic systems used in connection with vehicle suspensions.

The object of the present invention is to provide a system of this type which is better adapted to meet the requirements of practice than systems of same kind used to the present time, more especially from the point of view of simplicity and reduction of the space occupied.

The essential feature of the present invention consists in arranging systems of this kind in such manner that, for at least a portion of their total stroke, a part of the elastic means, for instance springs, with which they are provided is automatically prevented from expanding, which involves a modification of the flexibility of the system.

Other features of the present invention will result from the following detailed description of some specific embodiments.

Preferred embodiments of the present invention will be hereinafter described, with reference to the accompanying drawings, given merely by way of example, and in which:

Fig. 3 shows an elastic system for a suspension made according to another embodiment;

Fig. 4 is a plan view of an elastic system of the torsional bar type made according to the present invention;

Fig. 5 is a sectional view of this system, on the line 5—5 of Fig. 4;

Fig. 6 is a plan view of a system of the same kind made according to another embodiment;

Fig. 7 is a plan view of a system of the same kind made according to another embodiment;

Fig. 8 is a front view of a suspension system with transverse bars made according to the invention;

Fig. 9 is a diagram showing a flexibility curve obtained according to the invention.

Figure 1:
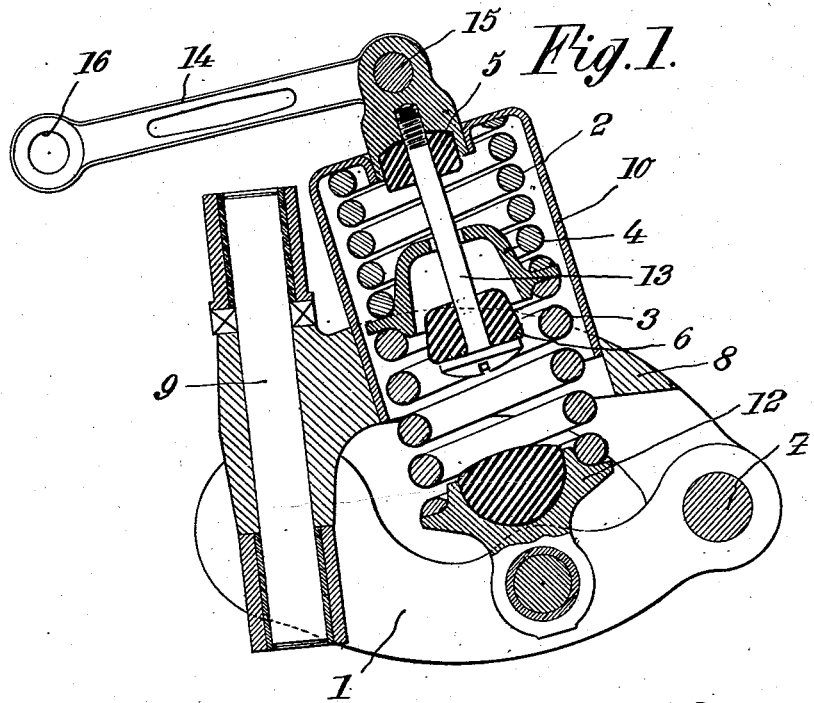
Fig. 1 is an elevational view, partly in section, of one of the elements of a vehicle suspension including independent wheels and oscillating arms for supporting said wheels, said suspension being fitted with an elastic system according to the invention and the whole being also made according to the invention.

The invention will be described as applied to an elastic system for an automobile vehicle suspension device, for instance of the type in which the wheel stub-axles are each carried by at least one oscillating arm such as 1 (Figs. 1 and 2) against which one of the elements of said elastic system exerts its action.

It is a known fact that a good suspension for a vehicle must have a rather great flexibility for positions close to the position of rest under normal load, while this flexibility must tend to decrease for extreme positions corresponding to high amplitude vertical displacements, it being well understood that the flexibility above referred to is shown by the curve representing the vertical displacements of the vehicle chassis (or the elements of the suspension) as a function of the variations of the load or of the force exerted by the elastic means of the suspension.

The working conditions above stated were already obtained in various manners, and especially through suitable arrangements of levers, cams or other elements interposed between the elastic means proper and the movable members of the suspension, for instance arms such as 1.

According to the present invention, the desired variation of the flexibility is obtained through such an arrangement of the elastic system that, during at least one of the extreme strokes corresponding to large vertical displacements, a part of the elastic means is automatically prevented from compressing or expanding, which obviously produces a modification in the curvature of the flexibility curve.

In order to carry out such an arrangement, I can proceed in various ways, for instance by having recourse to suitable abutments against which certain portions of the elastic means, or certain members connected therewith, are caused to bear as soon as the vertical displacements reach a predetermined amplitude.

For instance, if said elastic means consist of spiral springs, I provide at least two springs of this kind, 2 and 3 (Figs. 1 to 3) arranged in series and separated from each other by an intermediate plate 4 capable of coacting with one or the other of two stops or abutments 5, 6. These two springs may be either of the same flexibility or of different flexibilities.

With such an arrangement, as soon as said intermediate plate 4 comes, under the effect of upward vertical displacements supposed to correspond to compression of the springs, to bear against abutment 5, one of the springs, 2, ceases to be compressed and the flexibility of the whole decreases since it now consists merely of that of spring 3. The same phenomenon takes place for downward displacements. Consequently the flexibility curve of this system looks like that shown by Fig. 9, being characterized by a portion AB of large flexibility, corresponding to vertical displacements of small amplitude, and by two extreme portions AC and BD of reduced flexibility. Such a shape of curve is particularly advantageous for increasing the comfort of the suspension and creating a reaction which opposes any tendency of the vehicle to overturn laterally when negotiating a curve.

Figure 2:
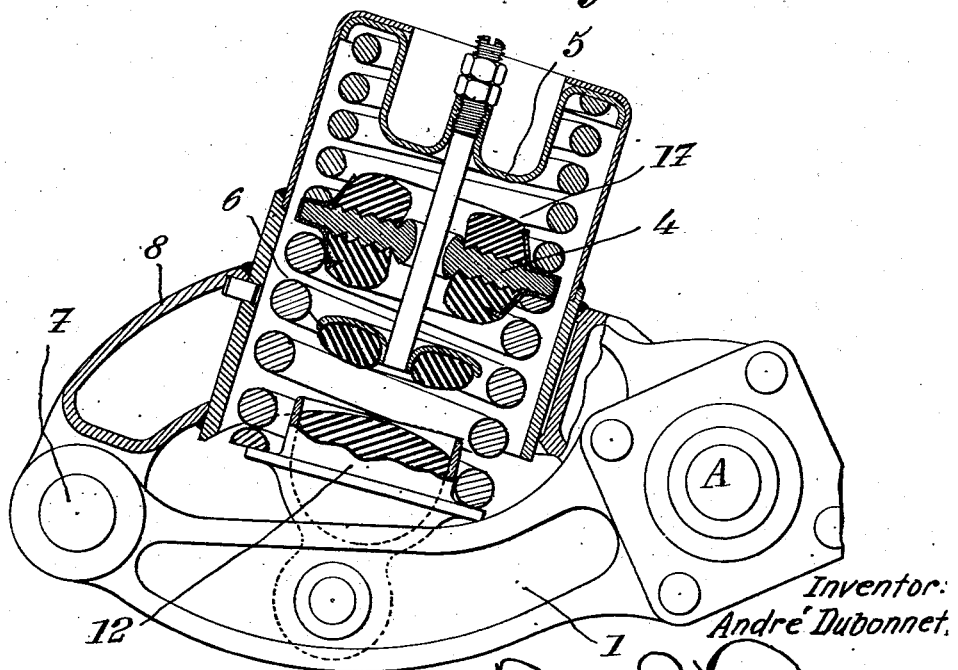
Fig. 2 shows an oscillating arm suspension made according to another embodiment.

The principle of the invention applies whatever be the elastic means that are employed. In Figs. 4 to 7, I have diagrammatically shown a suspension with a torsion spring 2. In this case, the plate 4 of Figs. 1 to 3 is replaced by at least one stop 4 moving together with said spring about the torsion axis and capable of coming into contact either with one stop 5, or with one or the other of the other of two stops 5, 6, arranged in suitable angular positions.

I may also provide two abutments 41 and 42 (Fig. 6) which, eventually, would be arranged at different points along the torsion axis. If, on the other hand, as shown by Fig. 7, the elastic means include two torsion springs 2, 3, disposed inside each other or corresponding to opposed directions respectively, I may dispose the stop or stops 4 at the point of junction of these two springs.

In all cases, it is advantageous to provide means for avoiding the presence of angular points on the flexibility curve at places where the latter is caused to vary, such means consisting for instance in the provision of cushions having a certain elasticity or plasticity associated with the above mentioned stops 4, 5 and 6.

Furthermore, said stops are preferably arranged in adjustable positions.

In Fig. 1, I have shown a suspension for independent wheels of the kind of those shown in my prior Belgian patent filed March 11, 1936, No. 414,306. Arm 1, carrying at A the wheel stub axle, oscillates about an axis 7 carried by another arm 8, the latter pivoting together with the whole of the suspension about a substantially vertical pivot 9. Springs 2 and 3, which are mounted in series bear, at their respective ends, on the one hand against the bottom of a cylinder 10 rigid with arm 8 (eventually with the interposition of an oscillating plate such as 11 in Fig. 3), and, on the other hand against a plate 12 pivoted to arm 1. Stops 5 and 6, which cooperate with the intermediate plate 4, are made of rubber and are carried, one by the bottom of said cylinder, and the other by a support 13 constituted for instance by a screw. At 14, I have shown a reaction rod pivoted, on the one hand to a fixed point 15 of the suspension, and, on the other hand, at 16, to the fixed plate of the brake support, mounted in an oscillating manner on the wheel stub axle.

A similar arrangement is shown in Fig. 2, in which the plate 4 is itself mounted on elastic cushions 17.

In Fig. 3, the plate 4 is given the shape of a ring sliding along a support 18 extending along the axis common to the springs.

In said Fig. 3, the reaction of the wheel is transmitted to the elastic system through an intermediate lever 19, according to an arrangement which is also known per se.

In order further to reduce the flexibility for upward vertical displacements, I may provide a supplementary spring 20 which is compressed only near the end of the compression stroke of the whole.

In any case, shock absorbing means will be advantageously combined with the system, and, for instance, the intermediate plate such as 4 might play a shock absorbing action during the portion of the stroke corresponding to line AB. In Fig. 3, the shock absorber has been shown as arranged inside support 18.

The system above described has an operation which is believed to result very clearly from the preceding explanations.

This system has many advantages, among which the chief ones are the following:

It is extremely simple and necessitates neither rods nor cams.

It can be adjusted in a very simple manner.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A suspension device for a wheel of a vehicle comprising a cylinder, means mounting said cylinder on the vehicle including means to permit the cylinder to move around a vertical axis with respect to the vehicle so as to permit steering of the wheel, a pair of coil springs of substantially equal diameter arranged in alignment at least partially within said cylinder, a wheel-carrying member operatively connected to said springs, a member between said springs and engaged thereby, and two stops secured to said cylinder on opposite sides of and engageable by said member, said member engaging one of said stops upon relative movement between said cylinder and wheel-carrier in one direction to render one of said springs inoperative and engaging the other stop upon relative movement between said cylinder and wheel-carrier in the opposite direction to render said spring inoperative, said stops being located within the springs.

2. A suspension device for a wheel of a vehicle, comprising, in combination, a wheel-carrying member oscillatably mounted on said vehicle to turn about a substantially horizontal axis, a cylinder mounted on the vehicle and having its axis transversely directed with respect to said wheel-carrying member, a pair of coil springs arranged in alignment at least partially within said cylinder and operatively connected to said wheel-carrying member at a point between the ends thereof, an abutment member between said springs and engaged thereby, and two stops secured to said cylinder on opposite sides of and engageable by said abutment member, said abutment member engaging one of said stops upon relative movement between said cylinder and wheel-carrier in one direction to render one of said springs inoperative and engaging the other stop upon relative movement between said cylinder and wheel-carrier in the opposite direction to render said spring inoperative, said stops being located within the springs.

ANDRÉ DUBONNET.